United States Patent
Li (10) Patent No.: US 9,291,766 B2
(45) Date of Patent: Mar. 22, 2016

(54) COLOR DEVIATION BALANCE THIN FILM, SIDE-TYPE BACKLIGHT MODULE AND LIQUID CRYSTAL DISPLAY DEVICE

(71) Applicants: BOE TECHNOLOGY GROUP CO., LTD., Beijing (CN); HEFEI BOE DISPLAY LIGHT CO., LTD., Anhui (CN)

(72) Inventor: Dejun Li, Beijing (CN)

(73) Assignees: BOE TECHNOLOGY GROUP CO., LTD., Beijing (CN); HEFEI BOE DISPLAY LIGHT CO., LTD., Hefei, Anhui (CN)

( * ) Notice: Subject to any disclaimer, the term of this patent is extended or adjusted under 35 U.S.C. 154(b) by 148 days.

(21) Appl. No.: 14/127,431

(22) PCT Filed: Nov. 1, 2012

(86) PCT No.: PCT/CN2012/083904
§ 371 (c)(1),
(2) Date: Dec. 18, 2013

(87) PCT Pub. No.: WO2013/135054
PCT Pub. Date: Sep. 19, 2013

(65) Prior Publication Data
US 2014/0132889 A1    May 15, 2014

(30) Foreign Application Priority Data

Mar. 12, 2012  (CN) .......................... 2012 1 0063702
Apr. 20, 2012  (CN) .......................... 2012 1 0119205

(51) Int. Cl.
*F21V 7/04*    (2006.01)
*F21V 8/00*    (2006.01)

(52) U.S. Cl.
CPC .............. *G02B 6/005* (2013.01); *G02B 6/0061* (2013.01); *G02B 6/0038* (2013.01);
(Continued)

(58) Field of Classification Search
CPC .... G02B 6/005; G02B 6/0043; G02B 6/0046; G02B 6/0061; G02B 6/0038; G02B 6/0053; G02B 6/0068; G02B 6/0055; G02B 6/0031
USPC ................ 362/600, 606, 615, 618, 608, 97.1; 349/65; 359/893; 14/600, 606
See application file for complete search history.

(56) References Cited

U.S. PATENT DOCUMENTS

2009/0080058 A1*   3/2009   Kothari et al. ................ 359/290
2012/0092750 A1*   4/2012   Kroll et al. .................... 359/291
2013/0250611 A1*   9/2013   Lee et al. ....................... 362/607

FOREIGN PATENT DOCUMENTS

CN    1553227 A    12/2004
CN    1242277 C     2/2006
(Continued)

OTHER PUBLICATIONS

First Chinese Office Action issued Sep. 2, 2013; Appln. No. 201210119205.2.
(Continued)

*Primary Examiner* — Bao Q Truong
*Assistant Examiner* — Jessica M Apenteng
(74) *Attorney, Agent, or Firm* — Ladas & Parry LLP (57) ABSTRACT

A color deviation balance thin film, a side-type backlight module and a liquid crystal display device. The color deviation balance thin film is applied to the side-type backlight module and the thickness of the color deviation balance thin film is gradually reduced along the backlight irradiation direction. The color deviation balance thin film is arranged in the side-type backlight module and the side-type backlight module with the color deviation balance thin film is arranged in the liquid crystal display device. When the side-type backlight module with the color deviation balance thin film is applied to the liquid crystal display device, the intensity difference of light at different positions along the backlight irradiation direction can be reduced, and the problem of the color deviation generated in the display picture can be effectively improved.

20 Claims, 3 Drawing Sheets (52) U.S. Cl.
CPC ............ *G02B 6/0043* (2013.01); *G02B 6/0046* (2013.01); *G02B 6/0053* (2013.01); *G02B 6/0055* (2013.01); *G02B 6/0068* (2013.01)

(56) References Cited

FOREIGN PATENT DOCUMENTS

| | | |
|---|---|---|
| CN | 101156106 A | 4/2008 |
| CN | 102128377 A | 7/2011 |
| CN | 102128415 A | 7/2011 |
| CN | 102588835 A | 7/2012 |
| CN | 102681049 A | 9/2012 |
| JP | 2007-042479 A | 2/2007 |
| WO | 2010/149583 A1 | 12/2010 |

OTHER PUBLICATIONS

Chinese Patent Grant Notification issued Apr. 8, 2014; Appln. No. 201210119205.2.
Grant Claims in the CN Application (CN 201210119205.2).
International Preliminary Report on Patentability Appln. No. PCT/CN2012/083904; Dated Sep. 16, 2014.
International Search Report mailed Feb. 7, 2013; PCT/CN2012/083904.

* cited by examiner

COLOR DEVIATION BALANCE THIN FILM, SIDE-TYPE BACKLIGHT MODULE AND LIQUID CRYSTAL DISPLAY DEVICE

FIELD OF THE INVENTION

Embodiments of the present invention relate to a color deviation balancing film, an edge-lit backlight module and a liquid crystal display (LCD) device using such an edge-lit backlight module.

BACKGROUND

As the development of the display technology of LCD, LCD has been used in various fields of display and people's requirements on the image quality of a LCD are also increasing.

Since a LCD does not emit light itself, the lighting quality of a backlight of the LCD is particularly important. Light Emitting Diode (LED) backlights have the benefits of high brightness, low power consumption and etc. as compared to conventional Cold Cathode Fluorescent Lamp (CCFL), therefore LED backlight modules have been applied in more and more LCD devices.

Figure 1:
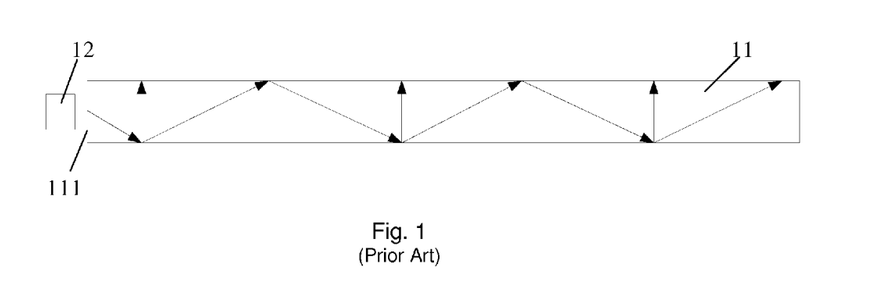
FIG. 1 schematically illustrates a structure of a conventional edge-lit backlight module.

There are two types of LED backlight modules, which are direct-lit backlight module and edge-lit backlight module respectively. With the edge-lit backlight module, light comes in from the edges, which is different from the direct-lit backlight module, therefore the number of the LED lights can be reduced, power consumption and production cost can be lowered, and also the thickness of a display device can be smaller. In the edge-lit backlight module, a light guide plate converts parallel incident light into upward-exiting planar light. The light guide plate comprises a substrate having an incident surface for receiving a light beam, a bottom surface adjoining the incident surface, an exiting surface adjoining the incident surface and opposed to the bottom surface, and a side surface adjoining the bottom surface and the exiting surface and opposed to incident surface. In the light guide plate, light is incident on the incident surface, then reflected to the exiting surface by the bottom surface and exits. In order to further improve the luminous efficiency, mesh dots may be arranged on the bottom surface or a mesh dot layer may be attached to the bottom surface so that light can be reflected to the exiting surface more efficiently by the mesh dot and then exits. As illustrated in FIG. 1, an edge-lit backlight module comprises a light guide plate 11 on the bottom surface of which a mesh dot layer is arranged and a light source 12 that comprises LEDs. The light source 12 is located on a side of the light guide plate 11 and light from the LEDs travels through the light guide plate 11 as illustrated by the arrow in the figure.

According to Beer-Lambert law, when a parallel monochrome light beam passes through a uniform non-diffusing light absorbing substance perpendicularly, the absorbance A of the monochrome light by the light absorbing substance is proportional to the concentration c of the light absorbing substance and the thickness b of the light absorbing layer as illustrated in the following Equation 1.

$$A = lg(1/T) = Kbc \qquad \text{Equation 1}$$

wherein A is the absorbance, T is the transmittance that represents a ratio of the intensity of the transmitted light to the intensity of the incident light, K is the molar absorption coefficient, c is the concentration of the light absorbing substance, and b is the thickness of the light absorbing layer. As illustrated in FIG. 1, upon light passing through the light guide plate, the excessive absorbing of light having certain wavelength by the light absorbing substance in the substrate of the light guide plate dramatically decreases the proportion of the light having certain wavelength in the whole light spectrum. Further, the light having certain wavelength can also be absorbed by the light absorbing substance in the mesh dot layer when it is reflected by the layer. As the optical path of the light and the times that the light is reflected in the substrate of the light guide plate increase, the total absorbing of the light having certain wavelength will continue increasing, which gradually reduces the intensity of the light having certain color, causes the intensity of the light having certain color varying along the backlight illuminating direction (the backlight illuminating direction herein means the light illuminating direction parallel to the bottom surface of the light guide plate), and thus makes the chroma of the displayed image deviated. Especially when applied in large scale LCDs, edge-lit backlight modules will result in severe chroma deviation of the displayed image.

SUMMARY

The embodiments of the present invention provide a color deviation balancing film, an edge-lit backlight module and a LCD device. The variation of the light intensity along the backlight illuminating direction can be reduced and thus the problem of the chroma deviation of the displayed image can be solved effectively when the edge-lit backlight module is used in the LCD device.

One aspect of the present invention provides a color deviation balancing film that can be used in an edge-lit backlight module. The thickness of the color deviation balancing film at both ends thereof decreases along the backlight illuminating direction.

For example, the relationship between the thickness of the color deviation balancing film and the length of the color deviation balancing film along the backlight illuminating direction may be a linear relationship represented by $Y1 = k1 \cdot X + H$, wherein Y1 is the minimal thickness of the color deviation balancing film, X is the length of the color deviation balancing film along the backlight illuminating direction, H is the maximum thickness of the color deviation balancing film, and the coefficient k1 is the slope value of the thickness of the color deviation film relative to the length thereof along the backlight illuminating direction. The slope value may be in the range from −0.00005 to −0.00015.

In an example of the color deviation balancing film, the slope value of the thickness of the color deviation film relative to the length thereof along the backlight illuminating direction may be −0.00008.

The material of the color deviation balancing film may be for example light curable resin.

Another aspect of the present invention provides an edge-lit backlight module comprising a light guide plate and an optical film arranged on the light guide plate. The edge-lit backlight module may further comprise the color deviation balancing film in accordance with embodiments of the present invention.

The edge-lit backlight module may further comprises a light source and the end of color deviation balancing film where the thickness of the color deviation balancing film is maximum is arranged near the light source.

The light guide plate may comprise a substrate having an incident surface for receiving a light beam, a bottom surface adjoining the incident surface, and an exiting surface adjoining the incident surface and opposed to the bottom surface. A mesh dot layer may be arranged on the bottom surface of the light guide plate, in which the dot density gradually decreases along the backlight illuminating direction.

For example, the relationship between the dot density of the mesh dot layer and the length along the backlight illuminating direction may be a linear relationship represented by $Y2=k2*X+\rho$, wherein Y2 is the dot density of the mesh dot layer, X is the length of the color deviation balancing film along the backlight illuminating direction, $\rho$ is the maximum density of the mesh dot of the mesh dot layer, the coefficient k2 is the slope value of the dot density of the mesh dot layer relative to the length along the backlight illuminating direction and may be in the range from −0.05 to −0.15.

For example, the slope value of the dot density of the mesh dot layer relative to the length along the backlight illuminating direction may be −0.08.

For example, the color deviation balancing film may be arranged on the optical film or between the optical film and the light guide plate.

A further aspect of the present invention provides a LCD device comprising the edge-lit backlight module.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

REFERENCE NUMBER 11, 21: light guide plate; 12, 23: light source; 111, 211: incident surface; 20: edge-lit backlight module; 210: substrate of light guide plate; 212: bottom surface; 213: exiting surface; 22: optical film; 24: color deviation balancing film.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention. It should be noted that the use of the article "a" and "an" before a component in the embodiments of the present invention is not for limiting number of the component.

The embodiments of the present invention provide a color deviation balancing film, an edge-lit backlight module and a LCD device. When the edge-lit backlight module is used in the LCD device, the variation of the light intensity along the backlight illuminating direction can be reduced and thus the problem of the chroma deviation of the displayed image can be solved effectively.

The embodiments of the present invention provide a color deviation balancing film that can be used in an edge-lit backlight module. The thickness of the color deviation balancing film gradually decreases along the backlight illuminating direction.

Figure 2:
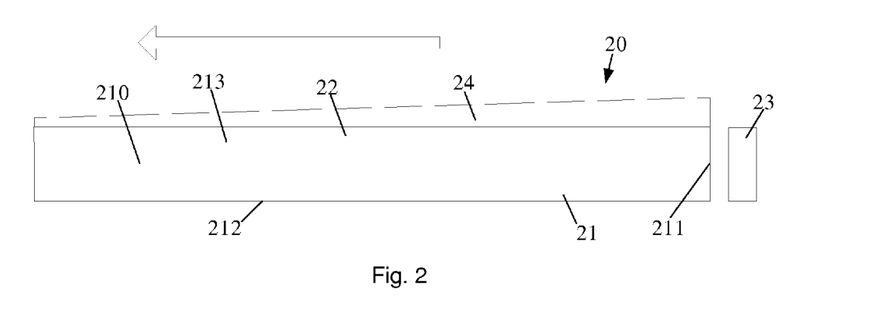
FIG. 2 schematically illustrates a backlight module in accordance with an embodiment of the present invention.
Figure 3:
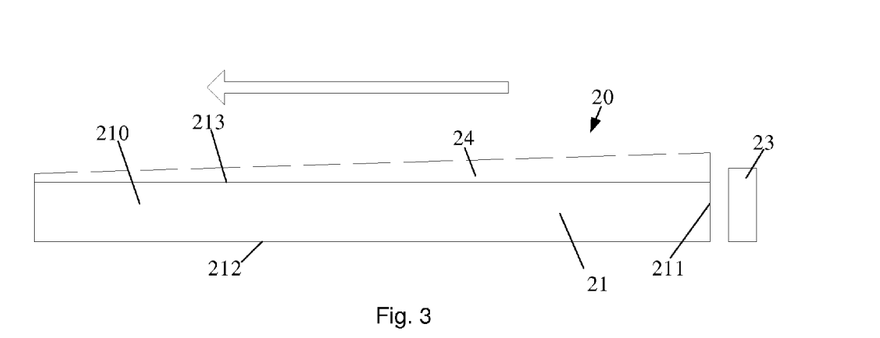
FIG. 3 schematically illustrates another backlight module in accordance with an embodiment of the present invention.
Figure 5:
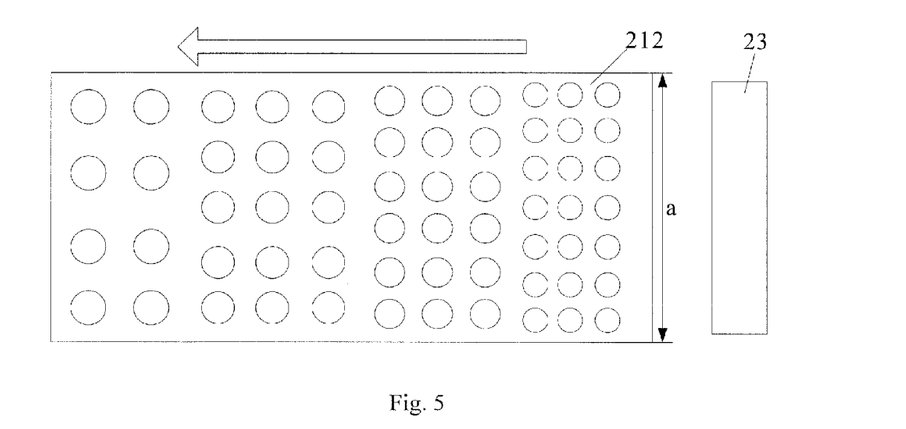
FIG. 5 schematically illustrates a mesh dot layer of a light guide plate in accordance with an embodiment of the present invention.

It is to be noted that, in the embodiments of the present invention, the backlight illuminating direction is the direction illustrated by the arrows in FIGS. 2, 3 and 5, that is, the light illuminating direction parallel to the bottom surface of the light guide plate.

The relationship between the thickness of the color deviation balancing film and the length of the color deviation balancing film along the backlight illuminating direction is a linear relationship represented by $Y1=k1*X+H$. Y1 is the minimal thickness of the color deviation balancing film (e.g., the thickness of the color deviation balancing film at the end thereof away from the light source), X is the length of the color deviation balancing film along the backlight illuminating direction, H is the maximum thickness of the color deviation balancing film (e.g., the thickness of the color deviation balancing film at the end thereof adjacent to the light source), and the coefficient k1 is the slope value of the thicknesses of both ends of the color deviation film relative to the length along the backlight illuminating direction. The value of the coefficient k1 is in the range from −0.00005 to −0.00015, preferably −0.00008.

The color deviation balancing film can be formed of light curable resin.

In particular, the color deviation balancing film can be formed of light curable resin through optical exposure curing-etching process.

As illustrated in FIG. 2, the present invention also provides an edge-lit backlight module 20 comprising a light guide plate 21 and an optical film 22 arranged on the light guide plate 21. The edge-lit backlight module 20 further comprises the color deviation balancing film 24 described above.

The thickness of the color deviation balancing film in accordance with the embodiments of the present invention decreases gradually along the backlight illuminating direction. The edge-lit backlight module provided by the present invention comprises the color deviation balancing film. Because the thickness of the transmissive film decreases with the length thereof along the backlight illuminating direction increasing, the absorbance of light having the light having certain wavelength by the absorbing substance in the transmissive film decreases with the decreasing of the thickness of the film. That is, the decrease of the light intensity is greater near the light source than away the light source. Therefore, variation of the light intensity along the backlight illuminating direction can be reduced, and the problem of chroma deviation of the displayed image can be effectively solved when the edge-lit backlight module is applied to the LCD.

The optical film in the edge-lit backlight module in accordance with the embodiments of the present invention can be diffusing film, prism film or a composite film for both diffusing and brightness enhancement. Accordingly, the color deviation balancing film 24 can be arranged on the optical film 22 or between the optical film 22 and the light guide plate 21.

Since typically a diffusing layer, a prism layer or a composite layer comprising a diffusing layer and a prism layer may be formed on the light guide plate of the conventional edge-lit backlight module, in the edge-lit backlight module 20 provided in the embodiment of the invention as illustrated in FIG. 2, the color deviation balancing film 24 can be directly formed on or can be arranged on the optical film 22 by using known process. In addition, the color deviation balancing film 24 can also formed or arranged between the optical film 22 and the light guide plate 21 (not illustrated) by using a process such as printing or coating. The color deviation balancing film 24 of the present invention can be formed on a variety of films or layers or structures of the edge-lit backlight module so as to solve the problem of chroma deviation in current product.

For example, when there is a diffusing layer on the light guide plate 21, the color deviation balancing film 24 can be formed on the diffusing layer by using wet coating process. When there is a prism layer on the light guide plate 21, the color deviation balancing film 24 can be formed on the prism layer by using ultraviolet (UV) drying process. When there is a composite layer comprising a diffusing layer and a prism layer on the light guide plate 21, the color deviation film 24 can be formed by using rolling process. With respect to the current wet coating process and the UV drying process, the jet head for coating the color deviation balancing film shall be modified to perform flow rate changing coating so that the thickness of the color deviation balancing film can be changed in a predetermined manner. When the color deviation balancing film is formed by the rolling process, the interval between the rolls shall continue changing so that the thickness of the color deviation balancing film can be changed in a predetermined manner.

The relationship between the thickness of the color deviation balancing film 24 and the length of the color deviation balancing film 24 along the backlight illuminating direction (the direct illustrated by the arrows in the drawings) is linear and can be represented by $Y1=k1*X+H$, wherein $Y1$ is the minimum thickness of the color deviation balancing film 24 (e.g., the thickness of the color deviation balancing film at the end thereof away from the light source), X is the length of the color deviation balancing film along the backlight illuminating direction, H is the maximum thickness of the color deviation balancing film (e.g., the thickness of the color deviation balancing film at the end thereof adjacent to the light source), and the coefficient k1 is the slope value of the thicknesses of both ends of the color deviation film relative to the length along the backlight illuminating direction, which is in the range from −0.00005 to −0.00015. The film having non-uniform thickness in accordance with the embodiments of the present invention can be applied to the edge-lit backlight modules of a wide variety of scales, and the thickness change trend of the film can be determined suitably as required by the scale of the edge-lit backlight module.

Figure 4:
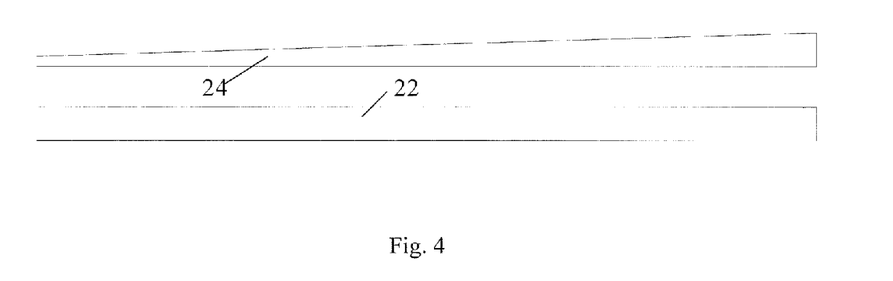
FIG. 4 compares a color deviation balancing film in accordance with an embodiment of the present invention and an optical film in the prior art.

As illustrated in FIG. 4, the shape of the color deviation balancing film 24 in accordance with the embodiments of the present invention is obviously different from that of the optical film 22. By using such a non-uniform transmissive film, the decrease of light intensity near the light source is greater than that away the light source, and as a result, the variation of light intensity along the backlight illuminating direction can be reduced. When the edge-lit backlight module is applied to a LCD device, the problem of chroma deviation of the displayed image can be effectively solved.

In the above edge-lit backlight module, there is a color deviation balancing film on the light guide plate or optical film, of which the thickness decreases along the backlight illuminating direction. Since the thickness of the transmissive film decreases with the length thereof along the backlight illuminating direction increasing, the absorbance of the light having certain wavelength by the light absorbing substance in the transmissive film will decrease with the thickness of the transmissive film decreasing. Therefore, the reduction of the light intensity is greater near the light source than away the light source and the variation of the light intensity along the backlight illuminating direction will decrease. When applied to a LCD device, the edge-lit backlight module can effectively solve the problem of chroma deviation of the displayed image.

In the embodiment illustrated in FIG. 2, the edge-lit backlight module 20 further comprises a light source 23 and the end of the color deviation balancing film 24 where the thickness thereof is maximum is arranged adjacent to the light source 23.

The light guide plate 21 comprises a substrate 210 having an incident surface 211 for receiving light, a bottom surface 212 adjoining the incident surface on which a mesh dot layer (not illustrated in FIG. 2) is arranged, and an exiting surface 213 adjoining the incident surface and opposed to the bottom surface. The density of the mesh dot of the mesh dot layer can decrease gradually along the backlight illuminating direction.

Specifically, the relationship between the density of the mesh dot of the mesh dot layer and the length along the backlight illuminating direction is linear and can be represented by $Y2=k2*X+\rho$, wherein $Y2$ is the density of the mesh dot of the mesh dot layer, X is the length of the color deviation balancing film along the backlight illuminating direction, $\rho$ is the maximum density of the mesh dot of the mesh dot layer, the coefficient k2 is the slope of the density of the mesh dot of the mesh dot layer relative to the length along the backlight illuminating direction and in the range from −0.05 to −0.15, preferably −0.08.

It is to be noted that the density of the mesh dot of the mesh dot layer herein means the percentage of coverage rate of the mesh dot, that is, the percentage of the area covered by the mesh dot per square millimeter. The mesh dot layer can be formed on the light guide plate by using control program such as a dedicated dot setting software.

Consequently, since the density of the light absorbing substance in the mesh dot layer decreases with the length along the backlight illuminating direction increasing, the decrease of the light intensity is greater near the light source than away the light source and variation of the light intensity along the backlight illuminating direction can be reduced. When applied to a LCD device, the edge-lit backlight module can effectively solve the problem of chroma deviation of the displayed image.

As illustrated in FIG. 5, the dot density of the mesh dot layer on the bottom surface 212 of the light guide plate 21 decreases along the backlight illuminating direction (the direction illustrated by the arrow in the drawing). The relationship between the dot density of the mesh dot layer and the length of the color deviation balancing film along the backlight illuminating direction is linear, and the slope of the dot density of the mesh dot layer relative to the length along the illuminating direction is in the range from −0.05 to −0.15, preferably −0.08.

Also, as illustrated in FIG. 5, in accordance with another embodiment of the present invention, the shape of the bottom surface 212 of the light guide plate 21 can be rectangle, and the light source 23 can be located on the side of the short side of the rectangle.

With the light source being located on the side of the short sides of the light guide plate and the mesh dot layer, the number of the lights used in the light source can be reduced and thus power consumption and product cost can be lowered.

In the embodiments of the present invention, the material of both the mesh dot layer and the color deviation balancing film 24 can be light curable resin that has the advantages of low cost and being easily processed. The color deviation balancing film 24 formed of light curable resin absorbs the light spectrum (especially light having wavelength below 400 nm) to some extent and thus light energy will be lost, therefore, the color deviation balancing film 24 shall be thin.

For example, the relationship between the thickness Y1 of the color deviation balancing film 24 and the length X of the color deviation balancing film 24 along the backlight illuminating direction is linear and can be represented by Y1=k1*X+H, wherein the slope value k1 of the thickness of the color deviation balancing film at both ends thereof relative to the length of the color deviation balancing film along the backlight illuminating direction is in the range from −0.00005 to −0.00015. The slope value k1 of the thickness of the color deviation balancing film at both ends thereof relative to the length of the color deviation balancing film along the backlight illuminating direction is preferably −0.00008. H represents the maximum thickness of the color deviation balancing film 24 (e.g., the thickness of the color deviation balancing film 24 at the end thereof near the light source). When H is 50 μm, the relationship between the thickness Y1 of the color deviation balancing film 24 and the length X of the color deviation balancing film 24 along the backlight illuminating direction is a linear relationship represented by Y1=−0.00008X+50, wherein both Y1 and X are in the unit of μm. For example, when the length X of the color deviation balancing film along the backlight illuminating direction is 10000 μm, the thickness Y1 of the color deviation balancing film is Y1=−0.8+50=49.2 μm; and when the length X of the color deviation balancing film along the backlight illuminating direction is 200000 μm, the thickness Y1 of the color deviation balancing film is Y1=−16+50=34 μm. With respect to a LCD device, the maximum of length X along the backlight illuminating direction is the length of the long side of the LCD device.

On the other hand, similar to the linear relationship between the thickness Y1 of the color deviation balancing film 24 and the length X of the color deviation balancing film 24 along the backlight illuminating direction, the relationship between the dot density Y2 of the mesh dot layer and the length X along the backlight illuminating direction is also linear and can be represented by Y2=k2*X+ρ. The slope value k2 of the dot density of the mesh dot layer relative to the length along the backlight illuminating direction is in the range from −0.05 to −0.15, preferably −0.08. ρ represents the maximum dot density of the mesh dot layer. Y2 is the percentage of dot coverage rate, that is, the percentage of the area covered by the dot per square millimeter. X is in the unit of mm. The slope value k2 of the dot density of the mesh dot layer relative to the length of the color deviation balancing film along the backlight illuminating direction is a coefficient in the unit of /mm. ρ is the maximum percentage of dot coverage rate of the mesh dot layer.

Figure 6:
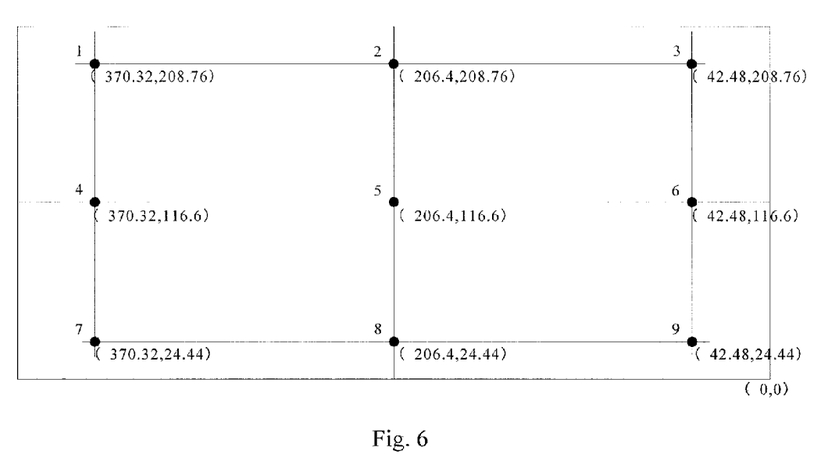
FIG. 6 schematically illustrates the selected dots on a 18.5 inch LCD device.

The benefits of the embodiments of the present invention will be described by taking an 18.5 inch LCD device as an example. As illustrated in FIG. 5, the light source of the LCD device emits light from the right side. As illustrated in FIG. 6, 9 dots on the surface of the LCD device are selected for testing. The coordinates of the 9 dots is selected in accordance with TCO5.0 specification, in which the lower right corner on the inner side of the rubber frame is selected to be the origin (0, 0), the coordinates of the test dot 1 are (370.32, 208.76), the coordinates of the test dot 2 are (206.4, 208.76), the coordinates of the test dot 3 are (42.48, 208.76), the coordinates of the test dot 4 are (370.32, 116.6), the coordinates of the test dot 5 are (206.4, 116.6), the coordinates of the test dot 6 are (42.48, 116.6), the coordinates of the test dot 7 are (370.32, 24.44), the coordinates of the test dot 8 are (206.4, 24.44), the coordinates of the test dot 9 are (42.48, 24.44), and the horizontal and vertical coordinates of each test dot are in the unit of mm. A unique color can be determined for each test dot by using the color coordinates in a chromaticity diagram, and the color coordinates (X, Y) used for representing the 9 test dots is listed in Table 1:

TABLE 1

|   | Sample dot 1 | Sample dot 2 | Sample dot 3 | Deviation |
|---|---|---|---|---|
| X | 0.2973 | 0.2938 | 0.2910 | 0.0063 |
| Y | 0.2894 | 0.2844 | 0.2804 | 0.0090 |
|   | Sample dot 4 | Sample dot 5 | Sample dot 6 | Deviation |
| X | 0.2973 | 0.2932 | 0.2906 | 0.0067 |
| Y | 0.2896 | 0.2836 | 0.2804 | 0.0092 |
|   | Sample dot 7 | Sample dot 8 | Sample dot 9 | Deviation |
| X | 0.2972 | 0.2940 | 0.2908 | 0.0064 |
| Y | 0.2896 | 0.2853 | 0.2806 | 0.0090 |

In table 1, the sample dots 1, 2 and 3 are in one optical path (dot 1 is the dot farthest from the light source and dot 3 is the dot nearest to the light source), the sample dots 4, 5 and 6 are in one optical path (dot 4 is the dot farthest from the light source and dot 6 is the dot nearest to the light source), and the sample dots 7, 8 and 9 are in one optical path (dot 7 is the dot farthest from the light source and dot 9 is the dot nearest to the light source). Color deviation is due to the accumulated absorbing of the light having certain wavelength by the medium though which the light travels in its optical path. If the color deviation is significant, the difference between the image color on the light incident side and the image color on the light exiting side even can be perceived by human eyes, resulting in bad visual effect. Therefore, the color deviation may be measured by using the difference between the color coordinates on the light exiting end and the color coordinates on the light incident end, and generally, may be simply calculated by using the measurement of the standard test dot. Aberration is color difference defined by chroma difference. The defined difference is the absolute value of the difference (deviation) between one color and another. If a direction is defined, positive direction means that the former is bigger than the latter and negative direction means that the former is smaller than the latter. When describing the difference, a maximum may be used. Chroma difference includes X chroma difference and Y chroma difference. According to current specification, each of X chroma difference and Y chroma difference is required to be within 10‰. Therefore, the maximum of X chroma difference and Y chroma difference is accounted to be the chroma difference. Generally, it is of high probability that Y chroma difference is greater than X chroma difference.

Referring to the present embodiment, the color deviation of this product is described by using the maximum among the chroma difference between dot 1 and dot 3, the chroma difference between dot 4 and dot 6, and the chroma difference between dot 7 and dot 9. As can be seen from the measurement result of this example, the color deviation of this product is 9.2‰ (the difference between the color coordinate Y of dot 4 and that of dot 6). It can be seen that the color deviation along the illuminating direction of the light in an existing 18.5 inch LCD device comprising an edge-lit backlight is about 10‰. Since the color deviation shall be within the limit of 10‰ according to current specification, the level of the color deviation of the 18.5 inch LCD device approximates to this limit and severe color deviation may occur. The larger the scale of the LCD display is, the severer the color deviation is.

In the 18.5 inch LCD device provided by the embodiments of the present invention, the light source is also located on the right side, and the materials of the mesh dot layer and of the color deviation balancing film are all light curable resin. The relationship between the thickness Y1 of the color deviation balancing film and the length X of the color deviation balancing film along the backlight illuminating direction is linear and represented by Y1=−0.08X+50. 9 dots on the surface of the LCD device are selected for testing. The coordinates of the 9 dots are also referring to those illustrated in FIG. 6. The color coordinates of each dot are illustrated in Table 2:

TABLE 2

|   | Sample dot 1 | Sample dot 2 | Sample dot 3 | Deviation |
|---|---|---|---|---|
| X | 0.2985 | 0.2950 | 0.2982 | 0.0003 |
| Y | 0.2906 | 0.2857 | 0.2926 | −0.0020 |
|   | Sample dot 4 | Sample dot 5 | Sample dot 6 | Deviation |
| X | 0.2983 | 0.2943 | 0.2974 | 0.0009 |
| Y | 0.2905 | 0.2847 | 0.2919 | −0.0014 |
|   | Sample dot 7 | Sample dot 8 | Sample dot 9 | Deviation |
| X | 0.2981 | 0.2949 | 0.2976 | 0.0005 |
| Y | 0.2904 | 0.2861 | 0.2920 | −0.0016 |

The method for calculating the deviation in Table 2 is same as that in Table 1. As can be seen from Table 2, the color deviation of the 18.5 inch edge-lit backlight LCD device provided by the embodiment of the invention is smaller that about 2‰ that is significantly reduced as compared to the color deviation of 9.2‰ of the existing LCD device.

It is to be noted that the minus sign in Table 2 is used for describing direction and the absolute value of the deviation shall be used for accounting color difference.

It is also to be noted that the sample dots in Tables 1 and 2 are obtained by using LCD device dedicated optical measuring instrument such as the popular SR-3 and BM-7 of Topcon Cooperation in the art. The embodiment of the present invention uses SR-3 that has a higher precision and can also be referred to as spectroradiometer or spectral luminance meter.

The data in the example illustrated in FIG. 2 is obtained by using a coating layer having a thickness of 25 μm on dots 1, 4 and 7 and a coating layer having a thickness of 50 μm on dots 3, 6 and 9 in a simulation experiment rather than using a finished film with uniform slope. Therefore, the data of dots 2, 5 and 8 is not regular.

With the edge-lit backlight module that comprises a color deviation balancing film, since the thickness of the transmissive film decreases with the length along the backlight illuminating direction increasing and thus the absorbance of the light having certain wavelength by the light absorbing substance in the transmissive film decreases with the thickness of the transmissive film decreasing, the decrease of light intensity is greater near the light source than away the light source. As a result, the variation of light intensity along the backlight illuminating direction can be reduced. When applied to a LCD device, the edge-lit backlight module can effectively solve the problem of chroma deviation of the displayed image. Furthermore, since the dot density of the mesh dot layer decreases along the backlight illuminating direction, the density of the light absorbing substance in the mesh dot layer decreases with the length along the backlight illuminating direction increasing. As a result, the decrease of light intensity is greater near the light source than away the light source, and the variation of light intensity along the backlight illuminating direction can be reduced. When applied to a LCD device, the edge-lit backlight module can effectively solve the problem of chroma deviation of the displayed image.

The embodiments of the present invention further provide a LCD device comprising the edge-lit backlight module as described above. The color deviation balancing film of the present invention can be used in the edge-lit backlight module. The relationship between the thickness of the color deviation balancing film and the length of the color deviation balancing film along the backlight illuminating direction is linear and represented by Y1=k1*X+H. Y1 is the minimal thickness of the color deviation balancing film. X is the length of the color deviation balancing film along the backlight illuminating direction. H is the maximum thickness of the color deviation balancing film. The coefficient k1 is the slope value of the thickness of the color deviation balancing film on both ends thereof relative to its length along the backlight illuminating direction. The value of the coefficient k1 is in the range from −0.00005 to −0.00015, preferably −0.00008.

The color deviation balancing film can be formed of light curable resin.

The LCD device provided by the present invention comprises a backlight module that includes a color deviation balancing film. The thickness of the color deviation balancing film gradually decreases along the backlight illuminating direction. Since the thickness of the transmissive film decreases with the length along the backlight illuminating direction increasing and thus the absorbance of the light having certain wavelength by the light absorbing substance in the transmissive film decreases with the thickness of the transmissive film decreasing, the decrease of light intensity is greater near the light source than away the light source. As a result, the variation of light intensity along the backlight illuminating direction can be reduced. When applied to a LCD device, the edge-lit backlight module can effectively solve the problem of chroma deviation of the displayed image.

It is to be noted that as compared to the current process, the method for forming the color deviation balancing film provided by the present invention shall be modified as follows:

With respect to wet coating process and UV drying process, the jet head in the art may be modified so that flow rate changed coating is performed under the control of a computer to form a thickness non-uniform color deviation balancing film in accordance with a predetermined thickness change trend, instead of performing flow rate constant coating to form a uniform film.

With respect to rolling process, the interval between rolls can be adjusted so as to form a thickness non-uniform color deviation balancing film in accordance with a predetermined thickness change trend.

Of course, the thickness non-uniform film of the embodiments of the present invention can be used in edge-lit backlight module and LCD device having a wide variety of scale. The thickness change trend of the product can be determined in accordance with the scale of the edge-lit backlight module and LCD device.

The foregoing is merely exemplary embodiments of the invention, but is not used to limit the protection scope of the invention. The protection scope of the invention shall be defined by the attached claims.

What is claimed is:

1. A color deviation balancing film applicable to an edge-lit backlight module, wherein a thickness of the color deviation balancing film gradually decreases along a backlight illuminating direction;

an absorbance of the backlight by an absorbing substance in the color deviation balancing film decreases with decreasing of the thickness of the color deviation balancing film.

2. The color deviation balancing film according to claim 1, wherein a relationship between the thickness of the color deviation balancing film and a length of the color deviation balancing film along the backlight illuminating direction is a linear relationship represented by $Y1=k1*X+H$; wherein Y1 is a minimal thickness of the color deviation balancing film, X is the length of the color deviation balancing film along the backlight illuminating direction, H is a maximum thickness of the color deviation balancing film, and the coefficient k1 is a slope value of the thicknesses of the color deviation film relative to the length along the backlight illuminating direction and is in a range from −0.00005 to −0.00015.

3. The color deviation balancing film according to claim 2, wherein the slope value of the thicknesses of the color deviation film relative to the length along the backlight illuminating direction is −0.00008.

4. The color deviation balancing film according to claim 2, wherein a material of the color deviation balancing film is light curable resin.

5. The color deviation balancing film according to claim 1, wherein a material of the color deviation balancing film is light curable resin.

6. An edge-lit backlight module comprising a light guide plate and an optical film arranged on the light guide plate, wherein the edge-lit backlight module further comprises the color deviation balancing film according to claim 1.

7. The edge-lit backlight module according to claim 6, wherein the edge-lit backlight module further comprises a light source and an end portion of the color deviation balancing film where the thickness of the color deviation balancing film is maximum is near the light source.

8. The edge-lit backlight module according to claim 6, wherein the light guide plate comprises a substrate having an incident surface for receiving a light beam, a bottom surface adjoining the incident surface, and an exiting surface adjoining the incident surface and opposed to the bottom surface, and a mesh dot layer is arranged on the bottom surface of the light guide plate, in which the mesh dot layer has a dot density gradually decreasing along the backlight illuminating direction.

9. The edge-lit backlight module according to claim 8, wherein a relationship between the dot density of the mesh dot layer and the length along the backlight illuminating direction is a linear relationship represented by $Y2=k2*X+\rho$, and wherein Y2 is the dot density of the mesh dot layer, X is the length of the color deviation balancing film along the backlight illuminating direction, $\rho$ is a maximum density of the mesh dot of the mesh dot layer, the coefficient k2 is a slope value of the dot density of the mesh dot layer relative to the length along the backlight illuminating direction and is in a range from −0.05 to −0.15.

10. The edge-lit backlight module according to claim 9, wherein the slope value of the dot density of the mesh dot layer relative to the length along the backlight illuminating direction is −0.08.

11. The edge-lit backlight module according to claim 6, wherein the color deviation balancing film is arranged on the optical film or between the optical film and the light guide plate.

12. A liquid crystal display (LCD) device comprising the edge-lit backlight module according to claim 6.

13. The LCD device according to claim 12, wherein the edge-lit backlight module further comprises a light source and an end portion of the color deviation balancing film where the thickness of the color deviation balancing film is maximum is near the light source.

14. The LCD device according to claim 12, wherein the light guide plate comprises a substrate having an incident surface for receiving a light beam, a bottom surface adjoining the incident surface, and an exiting surface adjoining the incident surface and opposed to the bottom surface, and a mesh dot layer is arranged on the bottom surface of the light guide plate, in which the mesh dot layer has a dot density gradually decreasing along the backlight illuminating direction.

15. The LCD device according to claim 12, wherein a relationship between the dot density of the mesh dot layer and the length along the backlight illuminating direction is a linear relationship represented by $Y2=k2*X+\rho$, and wherein Y2 is the dot density of the mesh dot layer, X is the length of the color deviation balancing film along the backlight illuminating direction, $\rho$ is a maximum density of the mesh dot of the mesh dot layer, the coefficient k2 is a slope value of the dot density of the mesh dot layer relative to the length along the backlight illuminating direction and is in a range from −0.05 to −0.15.

16. The LCD device according to claim 12, wherein the slope value of the dot density of the mesh dot layer relative to the length along the backlight illuminating direction is −0.08.

17. The LCD device according to claim 12, wherein the color deviation balancing film is arranged on the optical film or between the optical film and the light guide plate.

18. The edge-lit backlight module according to claim 6, wherein a relationship between the thickness of the color deviation balancing film and a length of the color deviation balancing film along the backlight illuminating direction is a linear relationship represented by $Y1=k1*X+H$; wherein Y1 is a minimal thickness of the color deviation balancing film, X is the length of the color deviation balancing film along the backlight illuminating direction, H is a maximum thickness of the color deviation balancing film, and the coefficient k1 is a slope value of the thicknesses of the color deviation film relative to the length along the backlight illuminating direction and is in a range from −0.00005 to −0.00015.

19. The edge-lit backlight module according to claim 6, wherein the slope value of the thicknesses of the color deviation film relative to the length along the backlight illuminating direction is −0.00008.

20. The edge-lit backlight module according to claim 6, wherein a material of the color deviation balancing film is light curable resin.

* * * * *